3,082,254
PROPYNYL HYDRAZOBENZENES
Chester E. Pawloski, Bay City, Mich., assignor to The Dow Chemical Company, Midland, Mich., a corporation of Delaware
No Drawing. Filed Mar. 31, 1961, Ser. No. 99,728
3 Claims. (Cl. 260—569)

This invention is directed to propynyl hydrazobenzenes corresponding to the formula

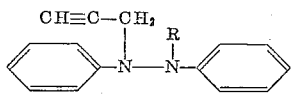

wherein R represents hydrogen or (2-propynyl). These compounds are crystalline materials somewhat soluble in many common organic solvents and of very low solubility in water. They are useful as parasiticides for the control and killing of a number of insect, bacterial and fungal organisms such as mites, ticks, round worms, aphids, beetles and nematodes.

The new hydrazobenzenes are prepared by reacting propargyl bromide or propargyl chloride with hydrazobenzene. The reaction is carried out in a liquid reaction medium such as diethyl ether, acetone, benzene or heptane and in the presence of a halide acceptor which conveniently is a basic material such as an alkali metal carbonate. The reaction takes place smoothly at the temperature range of from about 35°–100° C. with the production of the desired product and halide of reaction. This halide appears in the reaction mixture as the salt of the metal in the employed base. Good results are obtained when reacting about one molecular proportion of hydrazobenzene with about one molecular proportion of propargyl halide in the presence of about one molecular proportion of the halide acceptor. Where optimum yields of N-(2-propynyl) hydrazobenzene are desired, it is preferred to employ substantially equimolecular proportions of the reactants. For optimum yields of N,N'-di(2-propynyl) hydrazobenzene at least two molecular proportions of propargyl halide are employed with one molecular proportion of hydrazobenzene. In such preferred operations the hydrogen halide acceptor is employed in an amount substantially equimolecular with the employed amount of propargyl halide. Upon completion of the reaction, the desired product may be separated and purified by conventional procedures.

In carrying out the reaction, the propargyl halide, hydrazobenzene and halide acceptor are dispersed in the reaction medium and the resulting mixture maintained for a period of time with stirring at a temperature of from 35° to 100° C. to insure completion of the reaction. The reaction mixture conveniently is then washed with water and low boiling constituents removed by fractional distillation under reduced pressure to obtain the desired product as a residue.

The following examples merely illustrate the invention and are not to be construed as limiting.

EXAMPLE 1

N-(2-Propynyl) Hydrazobenzene

Hydrazobenzene (50 grams; 0.27 mole), 32 grams (0.27 mole) of propargyl bromide and 38 grams (0.27 mole) of potassium carbonate were dispersed in 300 milliliters of acetone and the resulting mixture heated with stirring for 24 hours at the boiling temperature and under reflux. The reaction mixture was then filtered while hot and the filtrate concentrated by heating at the boiling temperature to remove low boiling constituents. During this period, the reaction mixture separated into a solid layer and a liquid layer. The liquid layer was separated to obtain an N-(2-propynyl) hydrazobenzene product. This product crystallized upon standing and was found to have a melting point of 67°–68° C.

EXAMPLE 2

N,N'-(2-Propynyl) Hydrazobenzene

Hydrazobenzene (100 grams; 0.55 mole), 135 grams (1.1 moles) of propargyl bromide and 155 grams (1.1 moles) of potassium carbonate were dispersed in 500 milliliters of acetone and the resulting mixture heated with stirring for 40 hours at the boiling temperature of the reaction mixture and under reflux. The reaction mixture was then washed with a small amount of water and the washed mixture concentrated by distillation to remove low boiling constituents. As a result of these operations, there was obtained an N,N'-di(2-propynyl) hydrazobenzene product as a crystalline residue melting at 45°–46° C.

The novel products of the present invention are useful as parasiticides for the control of many parasite species. For such uses, the products are dispersed on an inert finely divided solid and employed as dusts. Such mixtures also may be dispersed in water with or without the aid of a surface active agent, and the resulting aqueous suspensions employed as sprays. In other procedures, the products are employed as active constituents in solvent solutions, oil-in-water or water-in-oil emulsions, or aqueous dispersions. In representative operations, aqueous compositions containing 1000 parts per million by weight of N,N'-di(2-propynyl) hydrazobenzene give 100 percent kills of southern army worms. In other operations, N,N'-di(2-propynyl) hydrazobenzene gives 100 percent controls of the growth of *Staphylococcus aureus* at concentration of 500 parts per million by weight.

I claim:
1. The compound selected from the group consisting of N-(2-propynyl) hydrazobenzene and N,N'-di(2-propynyl) hydrazobenzene.
2. N-(2-propynyl) hydrazobenzene.
3. N,N'-di(2-propynyl) hydrazobenzene.

References Cited in the file of this patent

Clemo et al.: "Jour. Chem. Soc." (London), pages 2417–19 (1954), 2 pages.
Reesor et al.: "Jour. Org. Chem.," vol. 22, pages 735–380 (1957). 5 pages.
(Copies in Patent Office Sci. Library.)